US009491590B2

United States Patent
Song et al.

(10) Patent No.: US 9,491,590 B2
(45) Date of Patent: Nov. 8, 2016

(54) GROUP COMMUNICATIONS OVER EVOLVED MULTIMEDIA BROADCAST/MULTICAST SERVICES

(75) Inventors: Bongyong Song, San Diego, CA (US); Yih-Hao Lin, San Diego, CA (US); Mark A. Maggenti, San Diego, CA (US); Kirankumar Anchan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 355 days.

(21) Appl. No.: 13/483,679

(22) Filed: May 30, 2012

(65) Prior Publication Data

US 2013/0136049 A1 May 30, 2013

Related U.S. Application Data

(60) Provisional application No. 61/491,815, filed on May 31, 2011.

(51) Int. Cl.

*H04W 76/00* (2009.01)
*H04L 12/70* (2013.01)
*H04W 4/06* (2009.01)

(52) U.S. Cl.

CPC ............. *H04W 4/06* (2013.01); *H04W 76/002* (2013.01)

(58) Field of Classification Search

USPC ........................................ 370/312; 455/414.1
See application file for complete search history.

(56) References Cited

U.S. PATENT DOCUMENTS 7,706,318 B2 4/2010 Lee et al.
8,068,843 B2 11/2011 Yi et al.
8,144,735 B2 3/2012 Vayanos et al.
8,553,631 B2 10/2013 Oprescu-Surcobe et al.
8,811,252 B2 * 8/2014 Maeda et al. ................ 370/312

(Continued)

FOREIGN PATENT DOCUMENTS

CN 1839596 A 9/2006
CN 101350947 A 1/2009

(Continued)

OTHER PUBLICATIONS

Alcatel-Lucent: "eMBMS Architecture: Alternatives for Allocation of MCE Function and Requirements on O&M", 3GPP Draft; R3-071240, 3rd Generation Partnership Project (3GPP), Mobile Competence Centre ; 650, Route Deslucioles; F-06921 Sophia-Antipolis Cedex; France, vol. TSG CN, No. Sophia; Jun. 13-14, 2007, XP050020533, [retrieved on Jun. 6, 2007].

(Continued)

*Primary Examiner* — Kevin C Harper
*Assistant Examiner* — Derrick V Rose
(74) *Attorney, Agent, or Firm* — Linda G. Gunderson

(57) ABSTRACT

The disclosure relates to group communications over multimedia broadcast-multicast services (MBMS). An embodiment of the disclosure establishes a first multicast flow and assigns a second multicast flow, wherein the second multicast flow contains signaling and media for at least one group call, and wherein the first multicast flow is configured to send information regarding activity on the second multicast flow. An embodiment of the disclosure monitors a first multicast flow for an announce message regarding a first group call, and upon receipt of the announce message, switches to a second multicast flow that contains signaling and media for the first group call.

28 Claims, 11 Drawing Sheets

(56) References Cited

U.S. PATENT DOCUMENTS

| | | | | |
|---|---|---|---|---|
| 2003/0035403 | A1* | 2/2003 | Choi | H04L 1/1887 370/342 |
| 2003/0157945 | A1* | 8/2003 | Chen et al. | 455/458 |
| 2005/0007971 | A1* | 1/2005 | Jeong et al. | 370/312 |
| 2005/0265433 | A1* | 12/2005 | Okumura | H04B 1/707 375/148 |
| 2008/0311892 | A1* | 12/2008 | Lee et al. | 455/414.1 |
| 2009/0061914 | A1 | 3/2009 | Cai | |
| 2010/0080159 | A1 | 4/2010 | Hu et al. | |
| 2012/0170501 | A1* | 7/2012 | Drozt et al. | 370/312 |
| 2012/0170502 | A1* | 7/2012 | Korus et al. | 370/312 |

FOREIGN PATENT DOCUMENTS

| | | | |
|---|---|---|---|
| CN | 101990165 | A | 3/2011 |
| WO | WO-2005079105 | A1 | 8/2005 |
| WO | 2005081569 | A1 | 9/2005 |

OTHER PUBLICATIONS

Hartung, F. et al., "MBMS-IP Multicast/Broadcast in 3G Networks", International Journal of Digital Multimedia Broadcasting, Jan. 1, 2009, pp. 1-25, vol. 2009, XP55035073, ISSN: 1687-7578, DOI: 10.1155/2009/597848.

International Search Report and Written Opinion—PCT/US2012/040172—ISA/EPO—Aug. 20, 2012.

Lescuyer, P. et al., "The Services" In: "Evolved Packet System (EPS): The LTE and SAE Evolution of 3G UMTS", Feb. 29, 2008, John Wiley & Sons, Ltd, XP55035074, ISBN: 978-0-47-072367-8.

Lohmar, T. et al., "Scalable push file delivery with MBMS", Ericsson Review (Incl. On), Telefonaktiebolaget LM Ericsson, No. 1, Jan. 1, 2009, pp. 12-16, XP001554044, ISSN: 0014-0171.

* cited by examiner

GROUP COMMUNICATIONS OVER EVOLVED MULTIMEDIA BROADCAST/MULTICAST SERVICES

CLAIM OF PRIORITY UNDER 35 U.S.C. §119

The present Application for Patent claims priority to Provisional Application No. 61/491,815, entitled "GROUP COMMUNICATIONS OVER EVOLVED MULTIMEDIA BROADCAST/MULTICAST SERVICES", filed May 31, 2011, and assigned to the assignee hereof and hereby expressly incorporated by reference herein.

FIELD OF DISCLOSURE

The present disclosure relates generally to communication, and more specifically to techniques for supporting group communications on broadcast and multicast services in a cellular communication system.

BACKGROUND

A cellular communication system can support bi-directional communication for multiple users by sharing the available system resources. Cellular systems are different from broadcast systems that can mainly or only support unidirectional transmission from broadcast stations to users. Cellular systems are widely deployed to provide various communication services and may be multiple-access systems such as Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, etc.

A cellular system may support broadcast, multicast, and unicast services. A broadcast service is a service that may be received by all users, e.g., a news broadcast. A multicast service is a service that may be received by a group of users, e.g., a subscription video service. A unicast service is a service intended for a specific user, e.g., a voice call. Group communications can be implemented using either unicast, broadcast, multicast, or a combination of each. As the group becomes larger, it is generally more efficient to use multicast services. However, for group communication services that require low latency and a short time to establish the group communication, the setup time of conventional multicast channels can be a detriment to system performance.

SUMMARY

The disclosure relates to group communications over multimedia broadcast-multicast services (MBMS). An embodiment of the disclosure establishes a first multicast flow and assigns a second multicast flow, wherein the second multicast flow contains signaling and media for at least one group call, and wherein the first multicast flow is configured to send information regarding activity on the second multicast flow. An embodiment of the disclosure monitors a first multicast flow for an announce message regarding a first group call, and upon receipt of the announce message, switches to a second multicast flow that contains signaling and media for the first group call.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
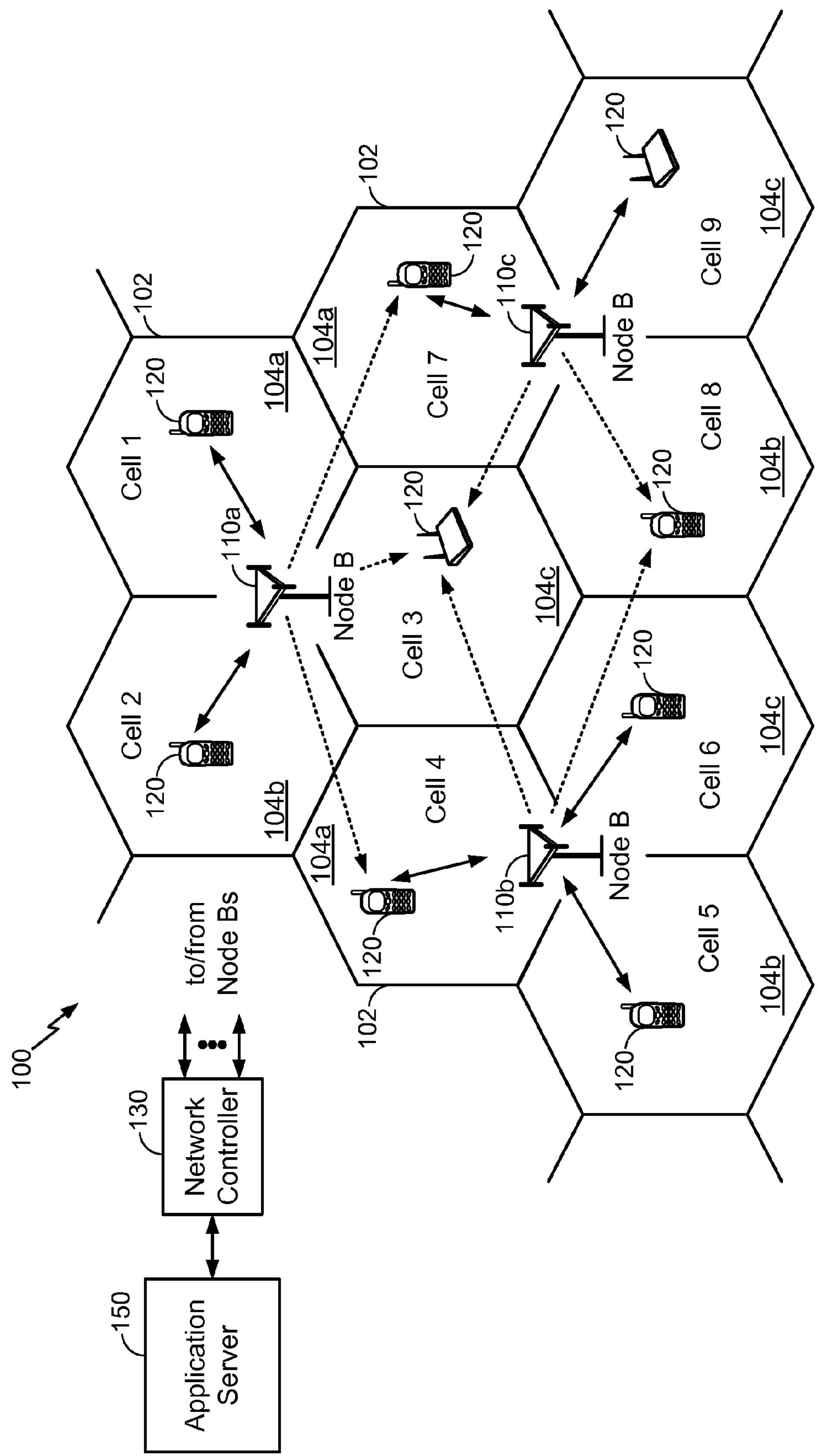
FIG. 1 illustrates an exemplary cellular communication system according to at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation. Further, as used herein the term group communication, push-to-talk (PTT), or similar variations are meant to refer to a server arbitrated service between two or more devices.

The terminology used herein is for the purpose of describing particular embodiments only and is not intended to be limiting of embodiments of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The techniques described herein may be used for various cellular communication systems such as CDMA, TDMA, FDMA, OFDMA and SC-FDMA systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). For clarity, certain aspects of the techniques are described below for LTE, and LTE terminology is used in much of the description below.

FIG. 1 shows a cellular communication system 100, which may be an LTE system. System 100 may include a number of Node Bs and other network entities. For simplicity, only three Node Bs, 110*a*, 110*b* and 110*c*, are shown in FIG. 1. A Node B may be a fixed station used for communicating with the user equipments (UEs) and may also be referred to as an evolved Node B (eNB), a base station, an access point, etc. Each Node B 110 provides communication coverage for a particular geographic area 102. To improve system capacity, the overall coverage area of a Node B may be partitioned into multiple smaller areas, e.g., three smaller areas 104*a*, 104*b* and 104*c*. Each smaller area may be served by a respective Node B subsystem. In 3GPP, the term "cell" can refer to the smallest coverage area of a Node B and/or a Node B subsystem serving this coverage area. In other systems, the term "sector" can refer to the smallest coverage area of a base station and/or a base station subsystem serving this coverage area. For clarity, the 3GPP concept of a cell is used in the description below.

In the example shown in FIG. 1, each Node B 110 has three cells that cover different geographic areas. For simplicity, FIG. 1 shows the cells not overlapping one another. In a practical deployment, adjacent cells typically overlap one another at the edges, which may allow a UE to receive coverage from one or more cells at any location as the UE moves about the system.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, etc. A UE may communicate with a Node B via transmissions on the downlink and uplink. The downlink (or forward link) refers to the communication link from the Node B to the UE, and the uplink (or reverse link) refers to the communication link from the UE to the Node B. In FIG. 1, a solid line with double arrows indicates bi-directional communication between a Node B and a UE 120. A dashed line with a single arrow indicates a UE 120 receiving a downlink signal from a Node B, e.g., for broadcast and/or multicast services. The terms "UE" and "user" are used interchangeably herein.

Network controller 130 may couple to multiple Node Bs to provide coordination and control for the Node Bs under its control, and to route data for terminals served by these Node Bs. System 100 may also include other network entities not shown in FIG. 1. Further, as illustrated, network controller 130 may be operably coupled to an application server 150 to provide group communication services to the various UEs 120 through access network 100. It will be appreciated that there can be many other network and system entities that can be used to facilitate communications between the UEs and servers and information outside of the access network. Accordingly, the various embodiments disclosed herein are not limited to the specific arrangement or elements detailed in the various figures.

Figure 2:
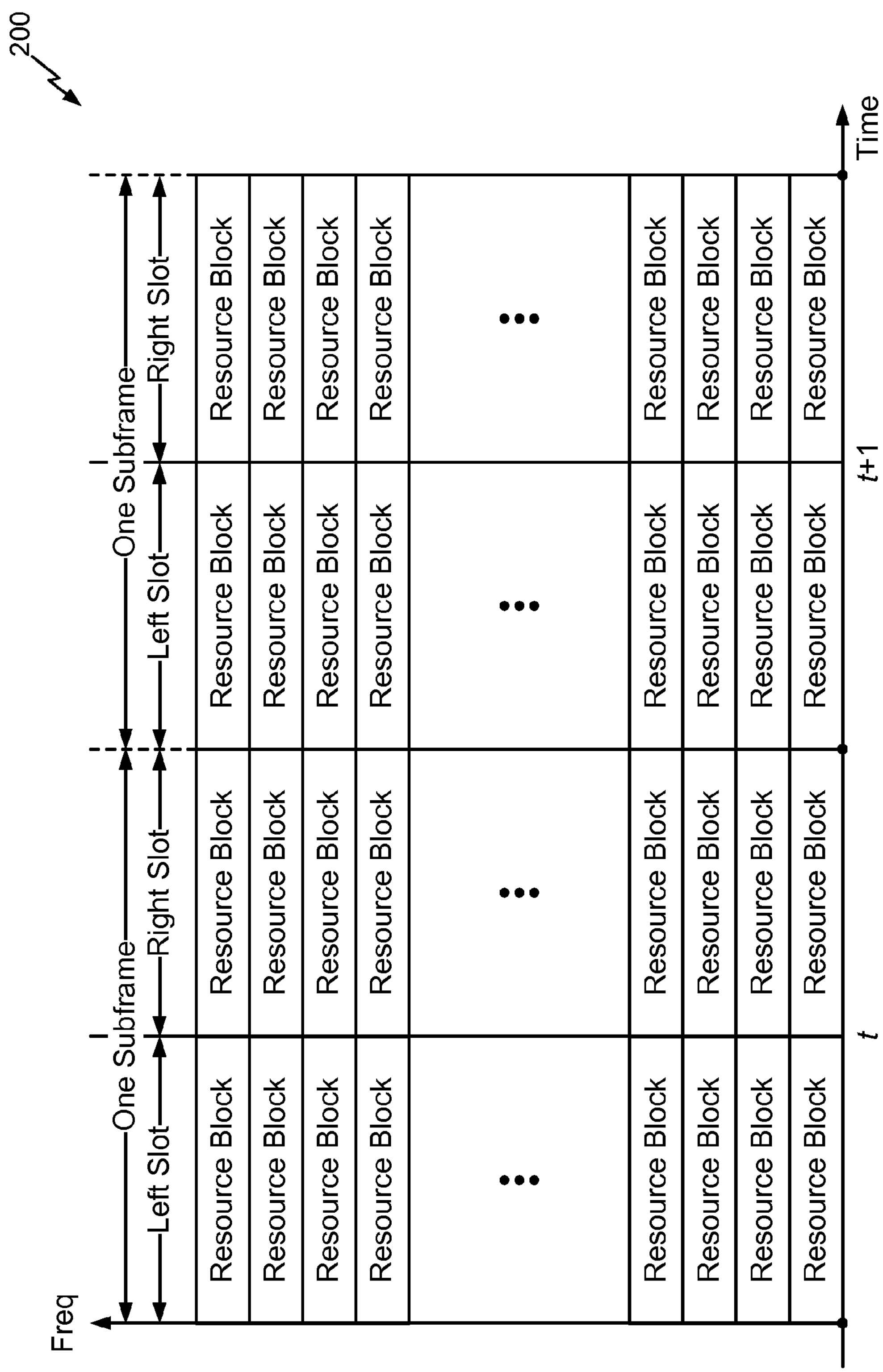
FIG. 2 illustrates an exemplary transmission structure according to at least one embodiment of the invention.

FIG. 2 shows an example transmission structure 200 that may be used for the downlink in system 100. The transmission timeline may be partitioned into units of radio frames. Each radio frame may have a predetermined duration (e.g., 10 milliseconds (ms)) and may be partitioned into 10 subframes. Each subframe may include two slots, and each slot may include a fixed or configurable number of symbol periods, e.g., six or seven symbol periods.

The system bandwidth may be partitioned into multiple (K) subcarriers with orthogonal frequency division multiplexing (OFDM). The available time frequency resources may be divided into resource blocks. Each resource block may include Q subcarriers in one slot, where Q may be equal to 12 or some other value. The available resource blocks may be used to send data, overhead information, pilot, etc.

The system may support evolved multimedia broadcast/multicast services (E-MBMS) for multiple UEs as well as unicast services for individual UEs. A service for E-MBMS may be referred to as an E-MBMS service or flow and may be a broadcast service/flow or a multicast service/flow.

In LTE, data and overhead information are processed as logical channels at a Radio Link Control (RLC) layer. The logical channels are mapped to transport channels at a Medium Access Control (MAC) layer. The transport channels are mapped to physical channels at a physical (PHY) layer. Table 1 lists some logical channels (denoted as "L"), transport channels (denoted as "T"), and physical channels (denoted as "P") used in LTE and provides a short description for each channel.

TABLE 1

| Name | Channel | Type | Description |
|---|---|---|---|
| Broadcast Control Channel | BCCH | L | Carry system information |
| Broadcast Channel | BCH | T | Carry master system information |

TABLE 1-continued

| Name | Channel | Type | Description |
|---|---|---|---|
| E-MBMS Traffic Channel | MTCH | L | Carry configuration information for E-MBMS services. |
| Multicast Channel | MCH | T | Carry the MTCH and MCCH |
| Downlink Shared Channel | DL-SCH | T | Carry the MTCH and other logical channels |
| Physical Broadcast Channel | PBCH | P | Carry basic system information for use in acquiring the system. |
| Physical Multicast Channel | PMCH | P | Carry the MCH. |
| Physical Downlink Shared Channel | PDSCH | P | Carry data for the DL-SCH |
| Physical Downlink Control Channel | PDCCH | P | Carry control information for the DL-SCH |

As shown in Table 1, different types of overhead information may be sent on different channels. Table 2 lists some types of overhead information and provides a short description for each type. Table 2 also gives the channel(s) on which each type of overhead information may be sent, in accordance with one design.

TABLE 2

| Overhead Information | Channel | Description |
|---|---|---|
| System Information | BCCH | Information pertinent for communicating with and/or receiving data from the system. |
| Configuration Information | MCCH | Information used to receive the information services, e.g., MBSFN area configuration, which contains PMCH configurations, service ID, session ID, etc. |
| Control Information | PDCCH | Information used to receive information transmissions of data for the services, e.g., resource assignments, modulation and coding schemes, etc. |

The different types of overhead information may also be referred to by other names. The scheduling and control information may be dynamic whereas the system and configuration information may be semi-static.

The system may support multiple operational modes for E-MBMS, which may include a multi-cell mode and a single-cell mode. The multi-cell mode may have the following characteristics:

- Content for broadcast or multicast services can be transmitted synchronously across multiple cells.
- Radio resources for broadcast and multicast services are allocated by an MBMS Coordinating Entity (MCE), which may be logically located above the Node Bs.
- Content for broadcast and multicast services is mapped on the MCH at a Node B.
- Time division multiplexing (e.g., at subframe level) of data for broadcast, multicast, and unicast services.

The single-cell mode may have the following characteristics:

- Each cell transmits content for broadcast and multicast services without synchronization with other cells.
- Radio resources for broadcast and multicast services are allocated by the Node Bs.
- Content for broadcast and multicast services is mapped on the DL-SCH.
- Data for broadcast, multicast, and unicast services may be multiplexed in any manner allowed by the structure of the DL-SCH.

In general, E-MBMS services may be supported with the multi-cell mode, the single-cell mode, and/or other modes. The multi-cell mode may be used for E-MBMS multicast/broadcast single frequency network (MBSFN) transmission, which may allow a UE to combine signals received from multiple cells in order to improve reception performance.

Figure 3:
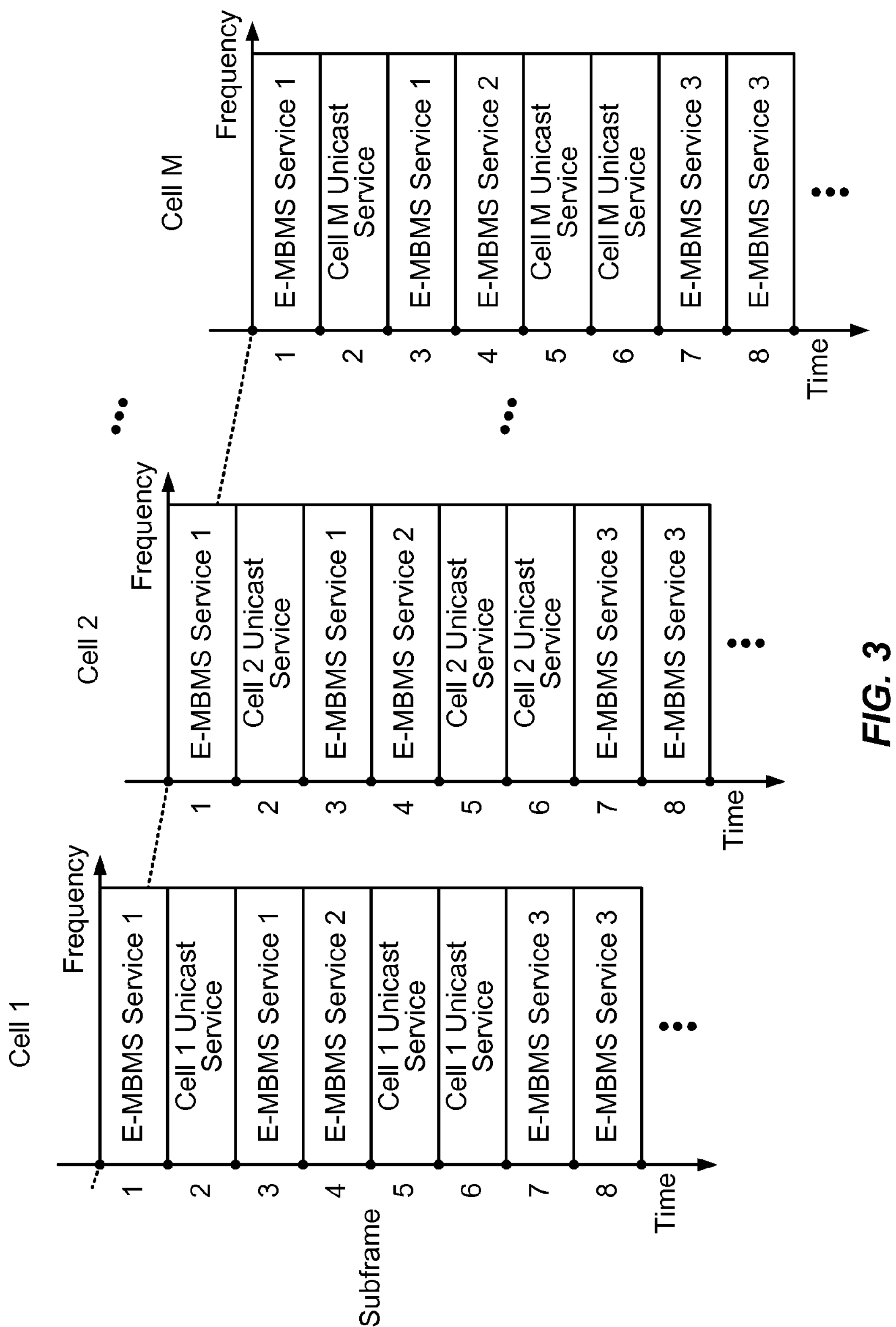
FIG. 3 illustrates example transmissions of different services in a multi-cell mode according to at least one embodiment of the invention.

FIG. 3 shows example transmissions of E-MBMS and unicast services by M cells 1 through M in the multi-cell mode, where M may be any integer value. For each cell, the horizontal axis may represent frequency, and the vertical axis may represent time. In one design of E-MBMS, which is assumed for much of the description below, the transmission time line for each cell may be partitioned into time units of subframes. In other designs of E-MBMS, the transmission time line for each cell may be partitioned into time units of other durations. In general, a time unit may correspond to a subframe, a slot, a symbol period, multiple symbol periods, multiple slots, multiple subframes, etc.

In the example shown in FIG. 3, the M cells transmit three E-MBMS services 1, 2 and 3. All M cells transmit E-MBMS service 1 in subframes 1 and 3, E-MBMS service 2 in subframe 4, and E-MBMS service 3 in subframes 7 and 8. The M cells transmit the same content for each of the three E-MBMS services. Each cell may transmit its own unicast service in subframes 2, 5 and 6. The M cells may transmit different contents for their unicast services.

Figure 4:
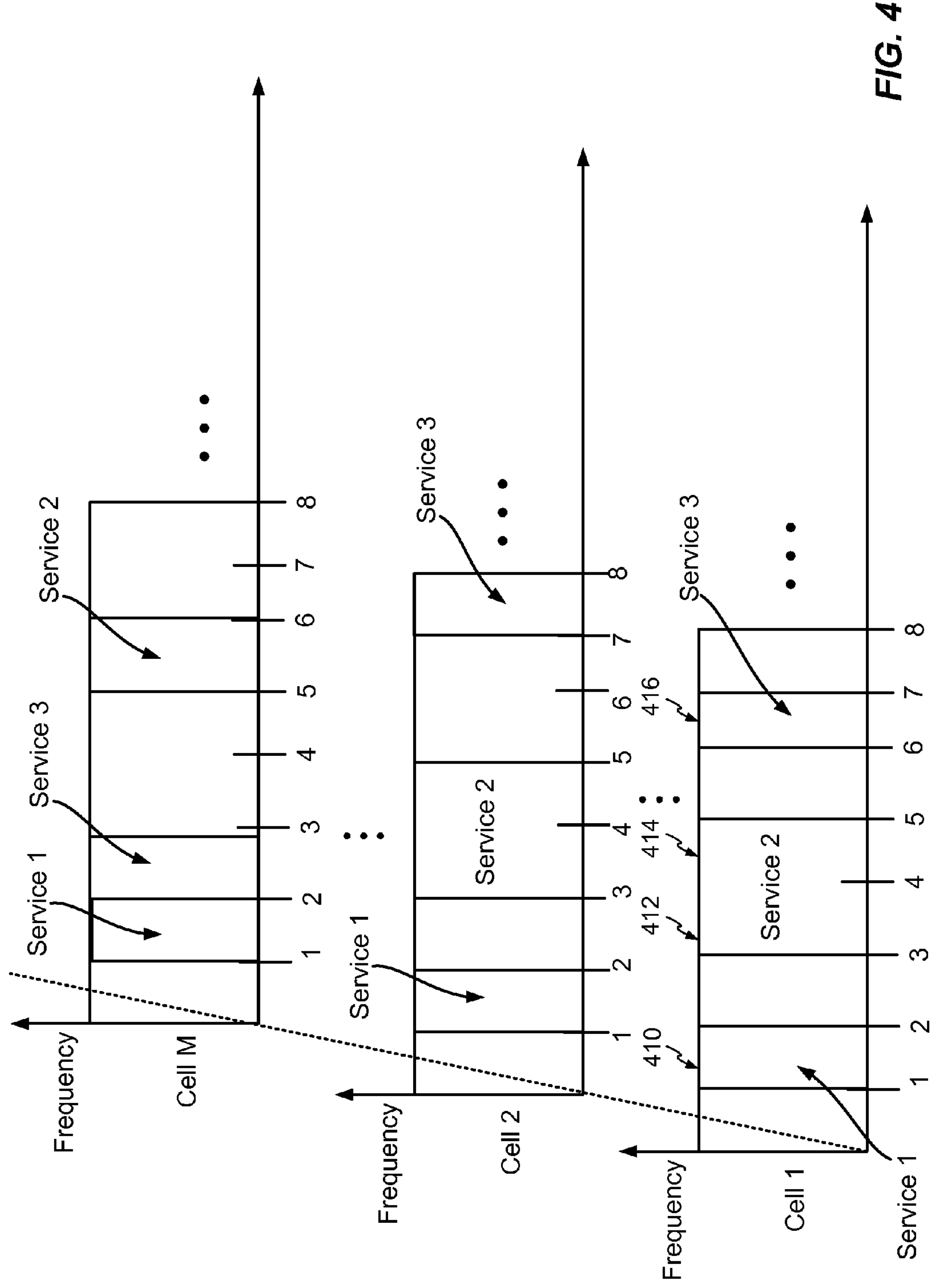
FIG. 4 illustrates example transmissions of different services in a single-cell mode according to at least one embodiment of the invention.

FIG. 4 shows example transmissions of E-MBMS and unicast services by M cells in the single-cell mode. For each cell, the horizontal axis may represent time, and the vertical axis may represent frequency. In the example shown in FIG. 4, the M cells transmit three E-MBMS services 1, 2 and 3. Cell 1 transmits E-MBMS service 1 in one time frequency block 410, E-MBMS service 2 in time frequency blocks 412 and 414, and E-MBMS service 3 in one time frequency block 416. Similarly, other cells transmit services 1, 2 and 3 as shown in FIG. 4.

In general, an E-MBMS service may be sent in any number of time frequency blocks. Each time frequency block may have any dimension and may cover any number of subcarriers and any number of symbol periods. The size of each time frequency block may be dependent on the amount of data to send and possibly other factors. The M cells may transmit the three E-MBMS services 1, 2 and 3 in time frequency blocks that may not be aligned in time and frequency, as shown in FIG. 4. Furthermore, the M cells may transmit the same or different contents for the three E-MBMS services. Each cell may transmit its own unicast service in remaining time frequency resources not used for the three E-MBMS services. The M cells may transmit different contents for their unicast services.

FIGS. 3 and 4 show example designs of transmitting E-MBMS services in the multi-cell mode and the single-cell mode. E-MBMS services may also be transmitted in other manners in the multi-cell and single-cell modes, e.g., using time division multiplexing (TDM).

As noted in the foregoing, E-MBMS services can be used to distribute multicast data to groups and could be useful in group communication systems. However, in conventional E-MBMS services, the time to establish a new flow is on the order of 10 seconds. This latency is unacceptable for high performance group communication systems, such as a push to talk system that requires less than 1 second from the call initiation from the originator to the granting of the floor to at least one group member.

Figure 5:
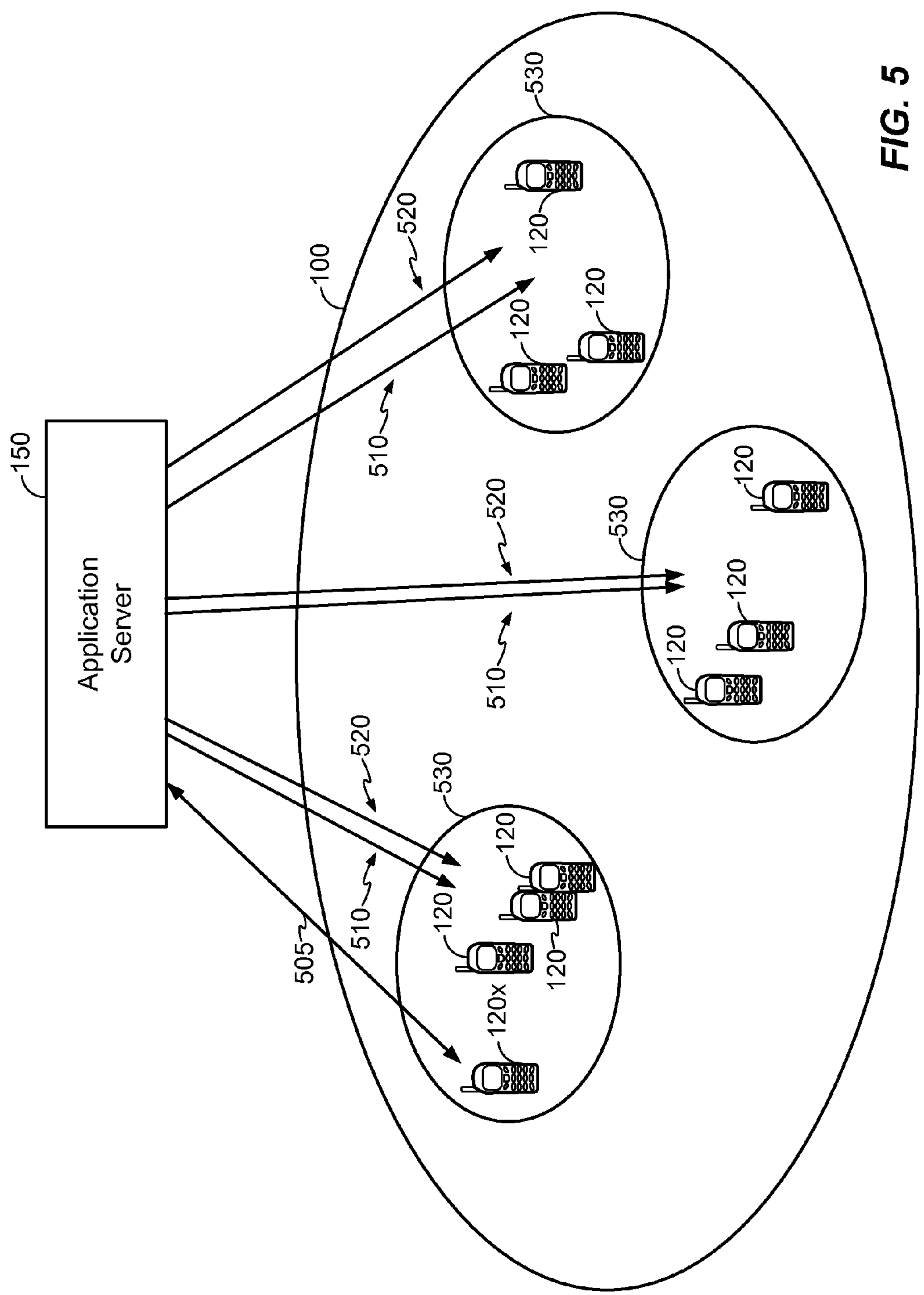
FIG. 5 illustrates a block diagram illustrating various exemplary flows between an application server and various user equipments according to at least one embodiment of the invention.

FIG. 5 illustrates an overview of an embodiment of the invention. Referring to FIG. 5, three pairs of broadcast flows 510 and 520 are each a separate E-MBMS flow over an LTE broadcast flow, each with its own application level broadcast stream with its own multicast IP address for each defined broadcast region/service area 530 (a subset of sectors within the network) within system 100. One flow of each pair of flows is an application layer "paging" flow called a primary multicast flow (P-MF) 510, to indicate activity or the desire for the listeners to start monitoring the other ("media and signaling") flow, called a secondary multicast flow (S-MF) 520. The P-MF 510 may be broadcast discontinuously to preserve mobile battery life. The S-MF 520 contains one or more application layer media/signaling streams, each comprising the information for a particular communications group. Although illustrated as separate regions, it will be appreciated that the broadcast areas may overlap.

Each multicast group call is associated with a P-MF 510, shared among multiple groups, for call announcement. The P-MF 510 is "always-on," meaning it is persistent across multicast group calls. It is shared among multiple groups and service areas 530 for call announcements. It has a long E-MBMS subframe schedule interval (e.g. 320 ms). A UE 120 may go to sleep between the scheduled E-MBMS subframe.

For each service area 530, application server 150 manages a pool of active S-MFs 520 for signaling and media. Application server 150 dynamically assigns a S-MF 520 for media and signaling to each multicast group in the call announcement. A S-MF 520 has a short eMBMS subframe schedule interval (e.g. 80 ms). A new S-MF 520 is added to the pool when the number of available S-MFs is below a given threshold. The same S-MF 520 may be assigned to multiple groups with the same service area 530 to increase the resource utilization in each subframe. Multiplexing is achieved at the IP or application level.

FIG. 5 additionally illustrates a unicast stream 505 to/from the application server 150 from/to a UE 120*x* that currently has the floor and is broadcasting media (which is turned around and put on the media broadcast stream and fed from the application server 150). For the call originator, both the application signaling and media are communicated via the unicast channel 505 on the uplink or the reverse link. Target UEs 120, however, receive multicast IP packets via point-to-multipoint OTA transmissions 510 and 520.

There may be more than one media flow (i.e. S-MF). There could be a single media flow that contains the information for multiple groups multiplexed, or a new media flow can be brought up every time the first media flow is used for active media in order to be ready in case a second group becomes active (at least one is always active). Alternately, there could be multiple media flows pre-setup which are generally fewer than the number of groups for a broadcast region (with groups assigned to real broadcast resources dynamically based on activity). In yet another embodiment, there could be a single media broadcast stream with bandwidth sufficient for multiple communications groups, but less than required for all the groups defined for the broadcast region, with the bandwidth assigned dynamically based on activity.

In most cases, there is only one "paging"/activity flow (i.e. P-MF) per broadcast region 530, so that if a user is a member of multiple groups, a UE 120 can monitor one flow to discover if there is activity on any of the groups of which it is a member.

The paging flow could be replaced by another method of indicating activity on the media flow, such as mobile-terminated DOS, or a push network such as Google® C2DM or Apple® APN, if available, to the application server 150. The alternative "paging" systems (e.g., DOS, C2DM, APN) will still benefit since the multicast streams are already set up and may be actively broadcasting all the time to allow for quick set up time for initiating the group communications.

Figure 6:
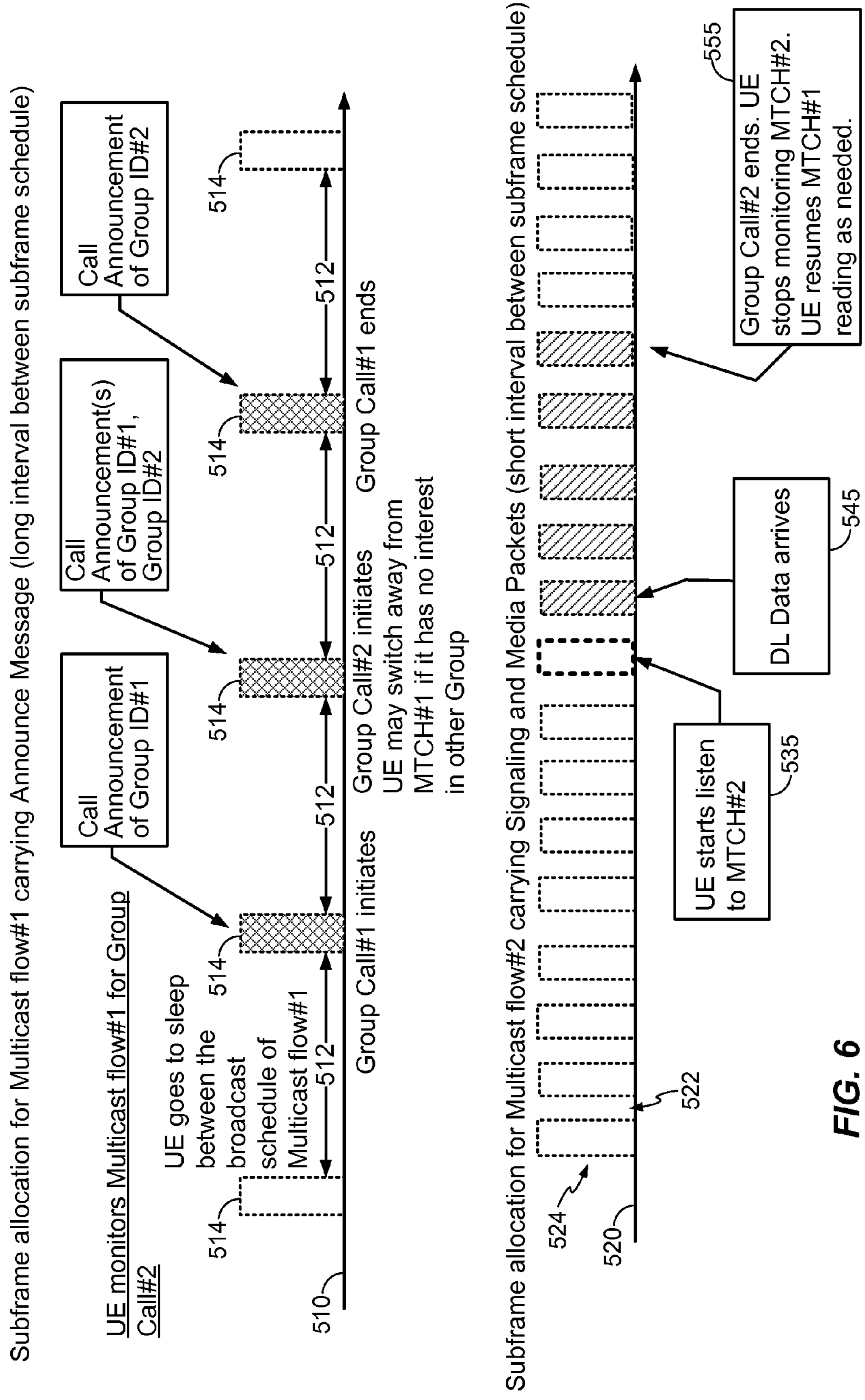
FIG. 6 illustrates a first multicast flow and a second multicast flow according to at least one embodiment of the invention.

FIG. 6 illustrates multicast flows 510 and 520 in greater detail. Referring to FIG. 6, to reduce the latency of the E-MBMS services, at least two flows (or services) are established and maintained. FIG. 6 illustrates a P-MF 510 that is configured as a "signaling" or "paging" channel, which allows for the UEs to monitor one flow to obtain information on media flows for multiple groups. FIG. 6 further illustrates an S-MF 520 that is also pre-reserved to avoid the delay in setting up the service/flow, as previously discussed. By having at least one additional flow 520 reserved, an application server can quickly establish a media flow 520 for a specific group. Additionally, once the new flow 520 is established, another flow 520 will be established to act as a new reserve flow 520 for any additional new groups that may need to start communicating. Further, it will be appreciated that more than one additional flow 520 may be reserved as system resources permit. However, maintaining excess always-on multicast flows will consume system resources. Likewise, if there is a maximum number of groups for which flows will be reserved, once that maximum is reached, additional flows would not be reserved to avoid wasting system resources. Further, as the groups stop communications, the flows can be released to conserve system resources.

Referring back to FIG. 6, P-MF 510 is assigned for "paging." For example, a call announcement message can be conveyed on flow 510 to inform UEs monitoring flow 510 that a group call is being established. To conserve power, there can also be long interval 512 between scheduled transmissions 514. The other multicast flow 520 for signaling and media traffic has a short schedule interval 522. The UE monitors the multicast flow for a "page" (e.g., a call announcement) and can go to sleep between the scheduled transmissions 514. The UE can switch 535 to the multicast flow 520 for signaling and media 524 when it receives a call announcement of the group to which the UE has subscribed. For example, at 545, after the switching, the downlink (DL) data arrives and the call is processed by the UE. At 555, the group call ends and the UE switches back to listening to the first flow 510 ("paging" flow).

As discussed in the foregoing, maintaining always-on multicast flows for all or a significant number of large group calls can be very costly in terms of bandwidth. Therefore, the application server can maintain a list of backup (i.e., pre-established and reserved) multicast flows for new multicast calls, as discussed herein. When a new multicast call is initiated, the application server can map the signaling and media traffic of the call to an assigned multicast flow 520 from the list of backup flows following an indication in the call announcement. The application server can remove the assigned multicast flow 520 from the backup list. Then, the application server can setup a new multicast flow 520 to replenish the backup multicast flows. It will be appreciated that the reserved/backup flows may have dummy traffic transmitted on them in some embodiments, so that there is continuous traffic, even when actual call media/signaling is not being transmitted.

It will be appreciated that the E-MBMS resource allocation is done in a TDM manner. The minimum schedule unit of the MTCH channels is a subframe (1 ms). Further, all subcarriers in a subframe are assigned together. It will also be appreciated that there are abundant resources available on DL for running multiple calls over a subframe. However, as multiplexing multicast flows onto the same E-MBMS subframe is very difficult, the utilization of E-MBMS resource for PTT calls can be low. Accordingly, in some embodiments, this can be addressed through application level or IP level (e.g. UDP port) multiplexing over a single multicast bearer. Each call can be associated with a pair of Multicast IP address and port number. The network may apply a packet filter to direct distinct Multicast IP flows through the same MTCH to facilitate implementation.

Figure 7:
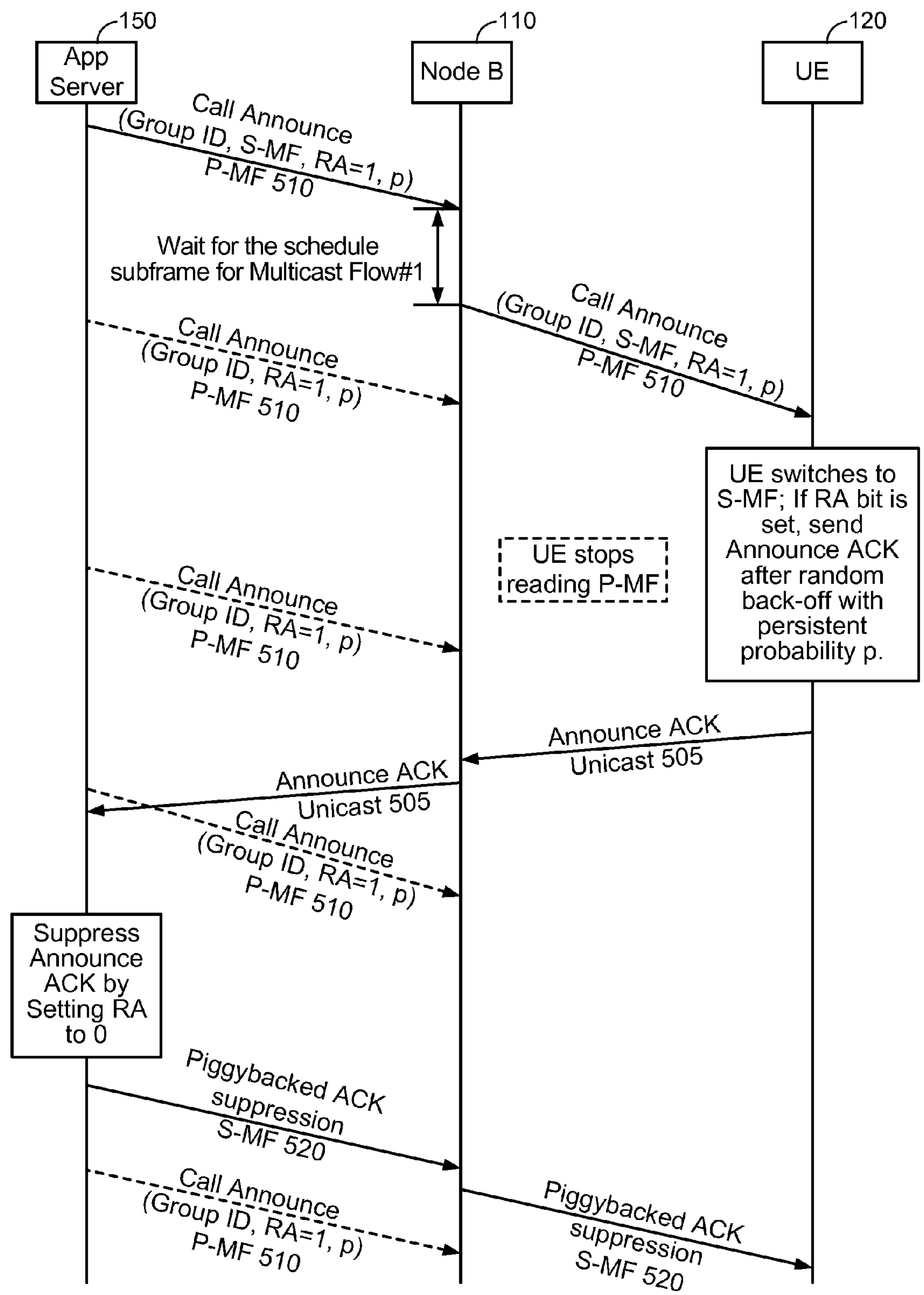
FIG. 7 illustrates an exemplary communication flow between an application server, a Node B, and a user equipment of an embodiment of the invention.

FIG. 7 illustrates an exemplary communication flow between application server 150, Node B 110, and UE 120 of an embodiment of the invention. The flow begins with application server 150 sending a call announcement for a multicast call to Node B 110 on the P-MF 510. The call announcement includes the group identifier for the group call, the assigned S-MF 520, a reverse activity (RA) bit set to 1, and a persistent probability p. Application server 150 can count the number of group members that are offline and set the persistent probability p accordingly. Application server 150 continues to transmit the call announcement on the P-MF 510, even after Node B 110 has forwarded it to UE 120, as indicated by the dashed lines.

Node B 110 waits for the schedule subframe for the P-MF 510, then forwards the call announcement to UE 120 on the P-MF 510. Upon receiving the call announcement, UE 120 switches to the assigned S-MF 520 and optionally stops reading the P-MF 510. If the RA bit is set, as it is in this case, UE 120 sends a call announcement ACK to Node B 110 on unicast channel 505 after a random back-off with persistent probability p. Node B 110 forwards the ACK to application server 150 on unicast channel 505. Application server 150 can suppress the call announcement ACK by setting the RA bit to 0. Application server 150 then transmits the piggybacked ACK suppression to Node B 110 on the assigned S-MF 520. Node B 110 forwards the piggybacked ACK suppression to UE 120 on the assigned S-MF 520.

Figure 8:
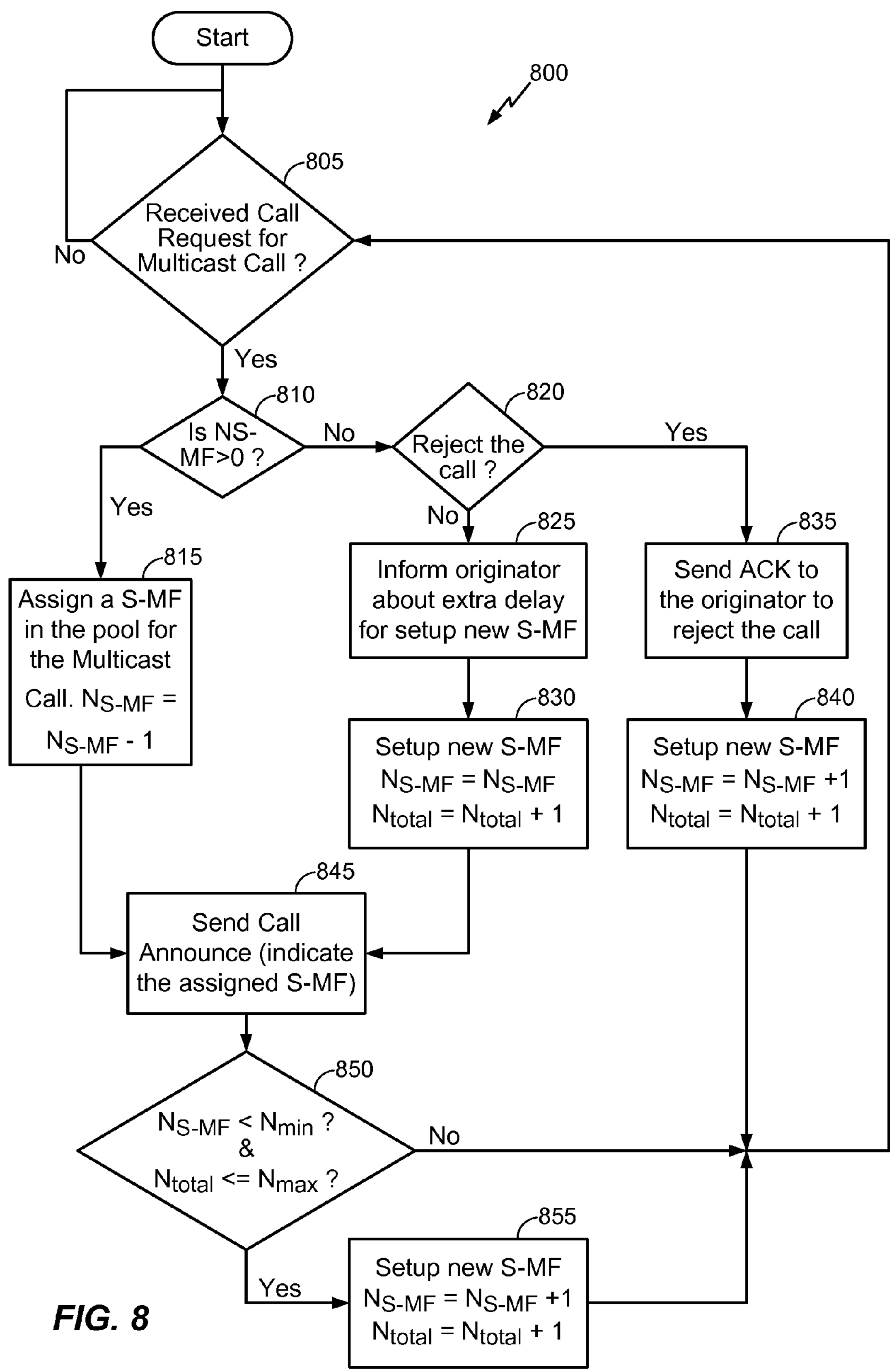
FIG. 8 illustrates a flowchart of an embodiment of the invention performed at the application server.

FIG. 8 illustrates a flowchart 800 of an embodiment of the invention performed at the application server 150. At 805, application server 150 determines whether or not a received call is a request for a multicast call. If it is not, then the application server continues to wait for a received call that is a request for a multicast call. If the received call is a request for a multicast call, then at 810, application server 150 determines whether the number of available S-MFs ($N_{S\text{-}MF}$) in a pool of available S-MFs is greater than 0. If it is, then at 815, application server 150 assigns an S-MF 520 in the pool to the received multicast call. The application server 150 then decrements $N_{S\text{-}MF}$ by one. If the number of available S-MFs is not greater than 0, then at 820, application server 150 determines whether or not it must reject the received multicast call. If application server 150 determines to reject the call, then at 835, application server 150 sends an ACK to the originator informing it that the call has been rejected. At 840, application server 150 sets up a new S-MF 520 and increments $N_{S\text{-}MF}$ and the total number of S-MFs ($N_{Total}$) by one. After setting up the new S-MF, application server 150 waits for another received call request for a multicast call at 805.

If, at 820, application server 150 determines that it does not have to reject the call, then at 825, application server 150 informs the originator that there will be an extra delay in setting up the multicast call because a new S-MF 520 must be setup. At 830, application server 150 sets up the new S-MF 520 and increments $N_{Total}$ by one. Application server 150 does not increment $N_{S\text{-}MF}$ because the newly setup S-MF 520 will be assigned to the requested multicast call at 845.

At 845, after either an existing S-MF 520 from the pool is assigned to the multicast call at 815 or an additional S-MF 520 is setup for the call at 830, application server 150 sends a call announcement to the target UEs indicating the S-MF 520 assigned to the call. At 850, application server 150 determines whether $N_{S\text{-}MF}$ is less than a minimum threshold ($N_{Min}$) and whether $N_{Total}$ is less than or equal to a maximum threshold ($N_{Max}$). If both conditions are true, then at 855, application server 150 sets up a new S-MF 520 and increments $N_{S\text{-}MF}$ and $N_{Total}$ by one. If, however, $N_{S\text{-}MF}$ is not less than $N_{Min}$ or $N_{Total}$ is not less than or equal to $N_{Max}$, or after 855, application server 150 waits for another received call request for a multicast call at 805.

Figure 9:
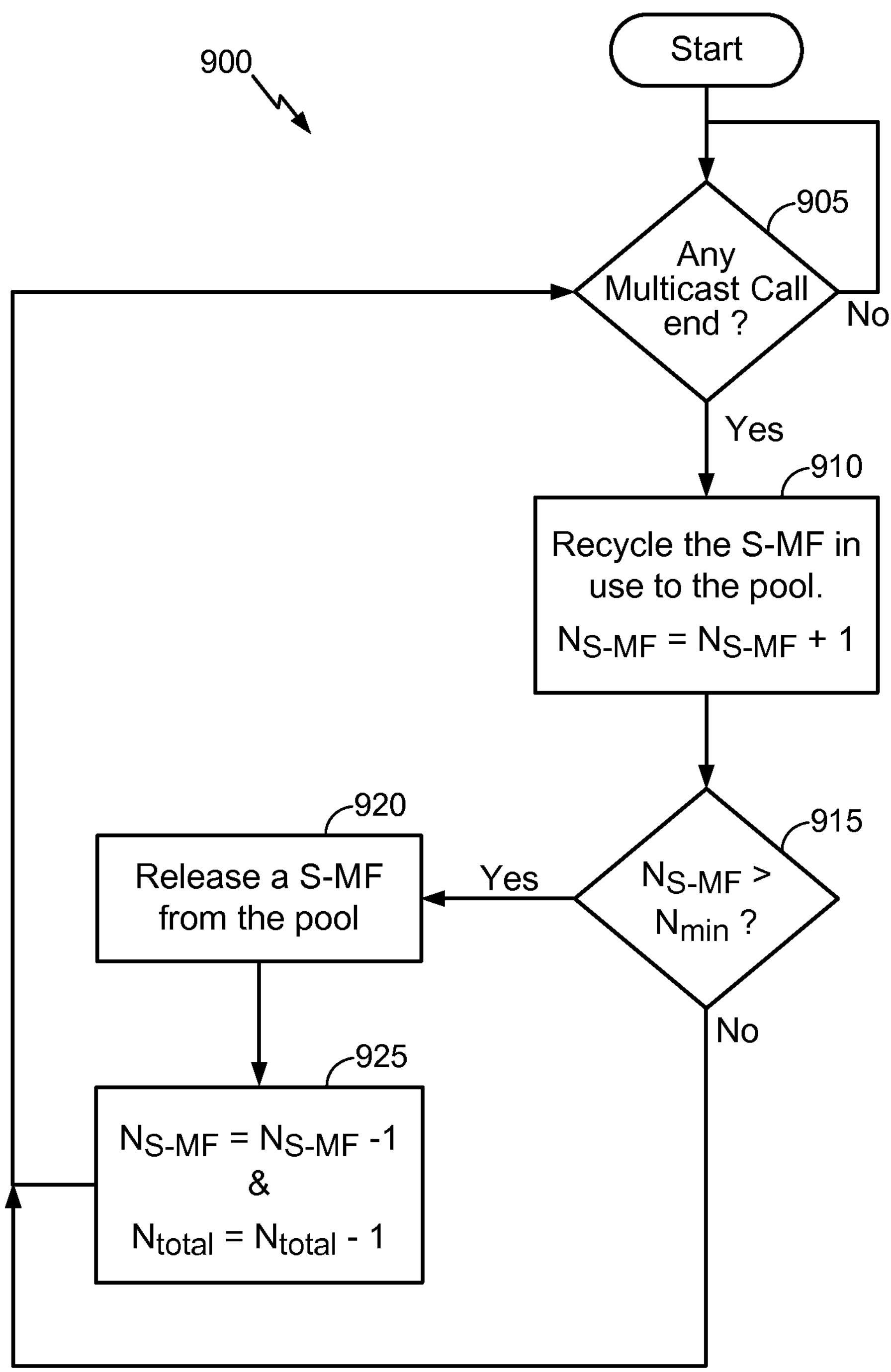
FIG. 9 illustrates a flowchart of an embodiment of the invention performed at the application server.

FIG. 9 illustrates a flowchart 900 of an embodiment of the invention performed at the application server 150. At 905, application server 150 determines whether any multicast calls have ended. If none have, application server continues to wait until one does end. If, however, a multicast call has ended, then at 910, application server 150 returns the released S-MF 520 to the pool of available S-MFs and increments $N_{S\text{-}MF}$ by one. At 915, application server 150 determines whether $N_{S\text{-}MF}$ is greater than $N_{Min}$. If it is, then at 920, application server 150 releases the S-MF 520 from the pool of available S-MFs. If it is not, application server 150 continues to wait for a multicast call to end at 905. At 925, application server 150 decrements $N_{S\text{-}MF}$ and $N_{Total}$ by one. Application server 150 then continues to wait for a multicast call to end at 905.

Figure 10:
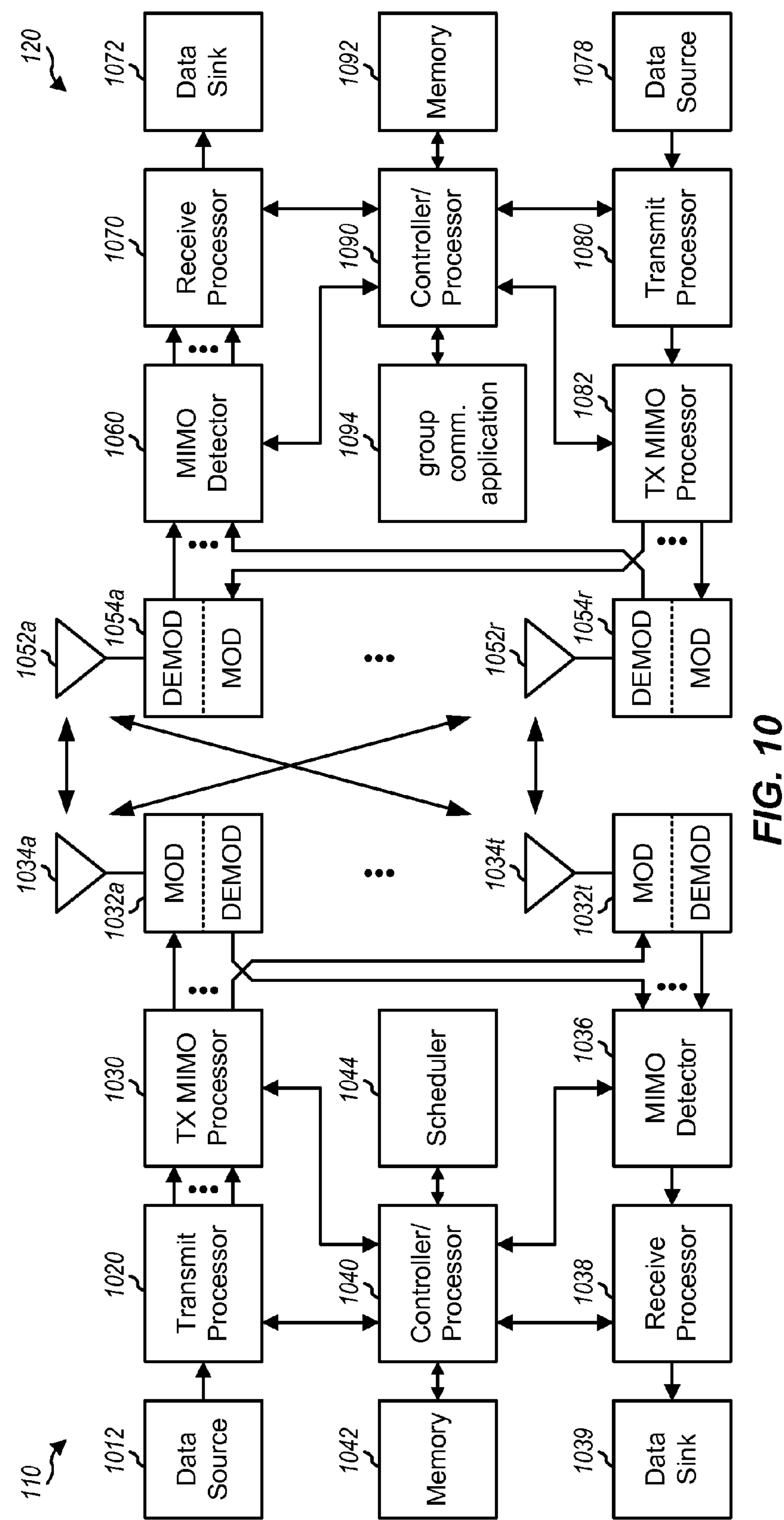
FIG. 10 shows a block diagram of an exemplary Node B and an exemplary user equipment according to at least one embodiment of the invention.

FIG. 10 illustrates a block diagram of a design of a Node B 110 and a UE 120, which may be one of the Node Bs and one of the UEs in FIG. 1 as discussed herein in relation to the various embodiments. In this design, Node B 110 is equipped with T antennas 1034*a* through 1034*t*, and UE 120 is equipped with R antennas 1052*a* through 1052*r*, where in general T is greater than or equal to 1 and R is greater than or equal to 1.

At Node B 110, a transmit processor 1020 may receive data for unicast services and data for broadcast and/or multicast services from a data source 1012 (e.g., directly or indirectly from application server 150). Transmit processor 1020 may process the data for each service to obtain data symbols. Transmit processor 1020 may also receive scheduling information, configuration information, control information, system information and/or other overhead information from a controller/processor 1040 and/or a scheduler 1044. Transmit processor 1020 may process the received overhead information and provide overhead symbols. A transmit (TX) multiple-input multiple-output (MIMO) processor 1030 may multiplex the data and overhead symbols with pilot symbols, process (e.g., precode) the multiplexed symbols, and provide T output symbol streams to T modulators (MOD) 1032*a* through 1032*t*. Each modulator 1032 may process a respective output symbol stream (e.g., for OFDM) to obtain an output sample stream. Each modulator 1032 may further process (e.g., convert to analog, amplify, filter, and upconvert) the output sample stream to obtain a downlink signal. T downlink signals from modulators 1032*a* through 1032*t* may be transmitted via T antennas 1034*a* through 1034*t*, respectively.

At UE 120, antennas 1052*a* through 1052*r* may receive the downlink signals from Node B 110 and provide received signals to demodulators (DEMOD) 1054*a* through 1054*r*, respectively. Each demodulator 1054 may condition (e.g., filter, amplify, downconvert, and digitize) a respective received signal to obtain received samples and may further process the received samples (e.g., for OFDM) to obtain received symbols. A MIMO detector 1060 may receive and process the received symbols from all R demodulators 1054$a$ through 1054$r$ and provide detected symbols. A receive processor 1070 may process the detected symbols, provide decoded data for UE 120 and/or desired services to a data sink 1072, and provide decoded overhead information to a controller/processor 1090. In general, the processing by MIMO detector 1060 and receive processor 1070 is complementary to the processing by TX MIMO processor 1030 and transmit processor 1020 at Node B 110.

On the uplink, at UE 120, data from a data source 1078 and overhead information from a controller/processor 1090 may be processed by a transmit processor 1080, further processed by a TX MIMO processor 1082 (if applicable), conditioned by modulators 1054$a$ through 1054$r$, and transmitted via antennas 1052$a$ through 1052$r$. At Node B 110, the uplink signals from UE 120 may be received by antennas 1034, conditioned by demodulators 1032, detected by a MIMO detector 1036, and processed by a receive processor 1038 to obtain the data and overhead information transmitted by UE 120. A data sink 1039 is coupled to receive processor 1038.

Controllers/processors 1040 and 1090 may direct the operation at Node B 110 and UE 120, respectively. Controller/processor 1040 may implement processes for the techniques described herein. Memories 1042 and 1092 may store data and program codes for Node B 110 and UE 120, respectively. In one embodiment, a group communication application 1094 may operate in cooperation with the various processors and other components of the UE 120 to monitor the first "paging" multicast flow and tune to the second "media/signaling" multicast flow when it is indicated there is a group call for a group of which the UE 120 is a member. Since detecting the paging, identifying the desired flow, and switching to the flow are performed at the application layer (e.g., by group communication application 1094), no changes are required to conventional LTE paging or media flows. Accordingly, latency can be reduced for group communications in the E-MBMS environment, while still remaining compliant with the existing standards.

Scheduler 1044 may schedule UEs for downlink and/or uplink transmission, schedule transmission of broadcast and multicast services, and provide assignments of radio resources for the scheduled UEs and services. Controller/processor 1040 and/or scheduler 1044 may generate scheduling information and/or other overhead information for the broadcast and multicast services.

Figure 11:
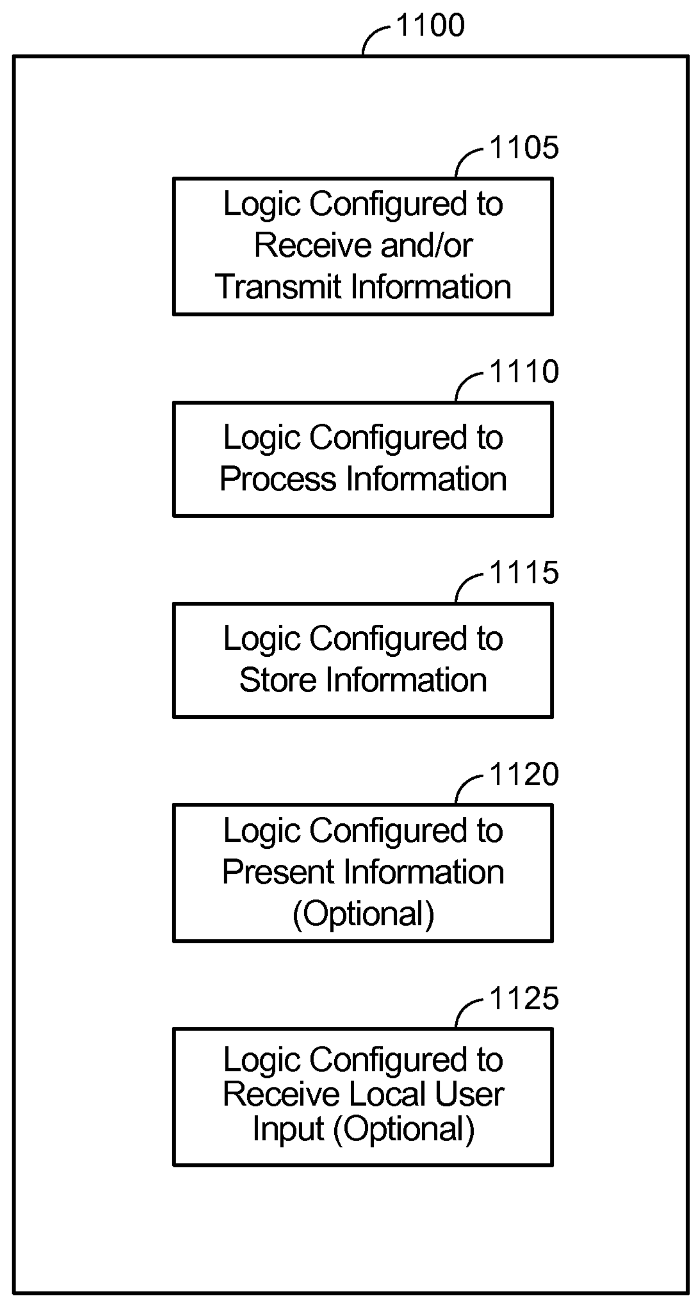
FIG. 11 illustrates a communication device that includes logic configured to perform functionality related to at least one embodiment of the invention.

FIG. 11 illustrates a communication device 1100 that includes logic configured to perform functionality. The communication device 1100 can correspond to any of the above-noted communication devices, including but not limited to UE 120, Node Bs or base stations 110, the network controller 130, etc. Thus, communication device 1100 can correspond to any electronic device that is configured to communicate with (or facilitate communication with) one or more other entities over a network.

Referring to FIG. 11, the communication device 1100 includes logic configured to receive and/or transmit information 1105. In an example, if the communication device 1100 corresponds to a wireless communications device (e.g., UE 120, Node B 110, etc.), the logic configured to receive and/or transmit information 1105 can include a wireless communications interface (e.g., Bluetooth, WiFi, 2G, 3G, etc.) such as a wireless transceiver and associated hardware (e.g., an RF antenna, a MODEM, a modulator and/or demodulator, etc.). In another example, the logic configured to receive and/or transmit information 1105 can correspond to a wired communications interface (e.g., a serial connection, a USB or Firewire connection, an Ethernet connection through which the Internet can be accessed, etc.). Thus, if the communication device 1100 corresponds to some type of network-based server (e.g., SGSN, GGSN, application server 150, etc.), the logic configured to receive and/or transmit information 1105 can correspond to an Ethernet card, in an example, that connects the network-based server to other communication entities via an Ethernet protocol. In a further example, the logic configured to receive and/or transmit information 1105 can include sensory or measurement hardware by which the communication device 1100 can monitor its local environment (e.g., an accelerometer, a temperature sensor, a light sensor, an antenna for monitoring local RF signals, etc.). The logic configured to receive and/or transmit information 1105 can also include software that, when executed, permits the associated hardware of the logic configured to receive and/or transmit information 1105 to perform its reception and/or transmission function(s). However, the logic configured to receive and/or transmit information 1105 does not correspond to software alone, and the logic configured to receive and/or transmit information 1105 relies at least in part upon hardware to achieve its functionality.

Referring to FIG. 11, the communication device 1100 further includes logic configured to process information 1110. In an example, the logic configured to process information 1110 can include at least a processor. Example implementations of the type of processing that can be performed by the logic configured to process information 1110 includes but is not limited to performing determinations, establishing connections, making selections between different information options, performing evaluations related to data, interacting with sensors coupled to the communication device 1100 to perform measurement operations, converting information from one format to another (e.g., between different protocols such as .wmv to .avi, etc.), and so on. For example, the processor included in the logic configured to process information 1110 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 1110 can also include software that, when executed, permits the associated hardware of the logic configured to process information 1110 to perform its processing function(s). However, the logic configured to process information 1110 does not correspond to software alone, and the logic configured to process information 1110 relies at least in part upon hardware to achieve its functionality.

Referring to FIG. 11, the communication device 1100 further includes logic configured to store information 1115. In an example, the logic configured to store information 1115 can include at least a non-transitory memory and associated hardware (e.g., a memory controller, etc.). For example, the non-transitory memory included in the logic configured to store information 1115 can correspond to RAM memory, flash memory, ROM memory, EPROM memory, EEPROM memory, registers, hard disk, a removable disk, a CD-ROM, or any other form of storage medium known in the art. The logic configured to store information 1115 can also include software that, when executed, permits the associated hardware of the logic configured to store information 1115 to perform its storage function(s). However, the logic configured to store information 1115 does not correspond to software alone, and the logic configured to store information 1115 relies at least in part upon hardware to achieve its functionality.

Referring to FIG. 11, the communication device 1100 further optionally includes logic configured to present information 1120. In an example, the logic configured to present information 1120 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 1100. For example, if the communication device 1100 corresponds to UE 120, the logic configured to present information 1120 can include the display of UE 120. In a further example, the logic configured to present information 1120 can be omitted for certain communication devices, such as network communication devices that do not have a local user (e.g., network switches or routers, remote servers, etc.). The logic configured to present information 1120 can also include software that, when executed, permits the associated hardware of the logic configured to present information 1120 to perform its presentation function(s). However, the logic configured to present information 1120 does not correspond to software alone, and the logic configured to present information 1120 relies at least in part upon hardware to achieve its functionality.

Referring to FIG. 11, the communication device 1100 further optionally includes logic configured to receive local user input 1125. In an example, the logic configured to receive local user input 1125 can include at least a user input device and associated hardware. For example, the user input device can include buttons, a touch-screen display, a keyboard, a camera, an audio input device (e.g., a microphone or a port that can carry audio information such as a microphone jack, etc.), and/or any other device by which information can be received from a user or operator of the communication device 1100. For example, if the communication device 1100 corresponds to UE 120, the logic configured to receive local user input 1125 can include the display of UE 120 (if implemented a touch-screen), the keypad, etc. In a further example, the logic configured to receive local user input 1125 can be omitted for certain communication devices, such as network communication devices that do not have a local user (e.g., network switches or routers, remote servers, etc.). The logic configured to receive local user input 1125 can also include software that, when executed, permits the associated hardware of the logic configured to receive local user input 1125 to perform its input reception function(s). However, the logic configured to receive local user input 1125 does not correspond to software alone, and the logic configured to receive local user input 1125 relies at least in part upon hardware to achieve its functionality.

Referring to FIG. 11, while the configured logics of 1105 through 1125 are shown as separate or distinct blocks in FIG. 11, it will be appreciated that the hardware and/or software by which the respective configured logic performs its functionality can overlap in part. For example, any software used to facilitate the functionality of the configured logics of 1105 through 1125 can be stored in the non-transitory memory associated with the logic configured to store information 1115, such that the configured logics of 1105 through 1125 each performs their functionality (i.e., in this case, software execution) based in part upon the operation of software stored by the logic configured to store information 1105. Likewise, hardware that is directly associated with one of the configured logics can be borrowed or used by other configured logics from time to time. For example, the processor of the logic configured to process information 1110 can format data into an appropriate format before being transmitted by the logic configured to receive and/or transmit information 1105, such that the logic configured to receive and/or transmit information 1105 performs its functionality (i.e., in this case, transmission of data) based in part upon the operation of hardware (i.e., the processor) associated with the logic configured to process information 1110.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for group communications over evolved multimedia broadcast/multicast services (E-MBMS). Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for group communications over multimedia broadcast-multicast services (MBMS) comprising:

establishing a first multicast flow;

establishing, prior to receipt of at least one request to establish at least one group call, one or more second multicast flows; and assigning at least one of the one or more second multicast flows to the at least one group call, wherein the at least one second multicast flow includes signaling and media for the at least one group call, and wherein the first multicast flow is configured to send information regarding activity on the at least one second multicast flow, and the first multicast flow has a subframe schedule interval that is greater than a subframe schedule interval of the at least one second multicast flow.

2. The method of claim 1, further comprising:

receiving the at least one request to establish the at least one group call;

sending at least one announce message for the at least one group call on the first multicast flow; and sending media and signaling data for the at least one group call on the at least one second multicast flow.

3. The method of claim 2, further comprising:

establishing one or more third multicast flows if a number of the one or more second multicast flows that is not assigned to any group call is less than a threshold.

4. The method of claim 1, wherein the first multicast flow is established prior to the receipt of the at least one request and is persistent.

5. The method of claim 1, wherein the information regarding the activity on the at least one second multicast flow includes scheduling information for the at least one second multicast flow.

6. The method of claim 1, wherein at least one other of the one or more second multicast flows is not assigned to any group call.

7. The method of claim 1, wherein the establishing establishes one or more additional second multicast flows if a number of the one or more second multicast flows that is not assigned to any group call is less than a threshold.

8. The method of claim 1, further comprising:

determining that the at least one group call has ended;

releasing the at least one second multicast flow; and if a number of the one or more second multicast flows that is not assigned to any group call is greater than a threshold after the release of the at least one second multicast flow, releasing one or more multicast flows of the one or more second multicast flows that are not assigned to any group call.

9. The method of claim 1, further comprising:

if a number of the one or more multicast flows that is not assigned to any group call is less than a minimum threshold and a total number of allocated multicast flows configured to transmit the signaling and media for the at least one group call is less than a maximum threshold, establishing one or more additional multicast flows configured to transmit the signaling and media for the at least one group call.

10. A method for group communications over multimedia broadcast-multicast services (MBMS) comprising:

monitoring a first multicast flow for at least one announce message regarding at least one group call, wherein the first multicast flow has a subframe schedule interval that is greater than a subframe schedule interval of one or more second multicast flows that are established prior to establishment of the at least one group call, and upon receipt of the at least one announce message, switching to at least one of the one or more second multicast flows that includes signaling and media for the at least one group call.

11. The method of claim 10, wherein the first multicast flow carries scheduling information for the at least one second multicast flow.

12. The method of claim 11, further comprising:

entering an idle state during the subframe schedule interval of the first multicast flow.

13. An apparatus for group communications over multimedia broadcast-multicast services (MBMS) comprising:

logic configured to establish a first multicast flow;

logic configured to establish, prior to receipt of at least one request to establish at least one group call, one or more second multicast flows; and logic configured to assign at least one of the one or more second multicast flows to the at least one group call, wherein the at least one second multicast flow includes signaling and media for the at least one group call, and wherein the first multicast flow is configured to send information regarding activity on the at least one second multicast flow, and the first multicast flow has a subframe schedule interval that is greater than a subframe schedule interval of the at least one second multicast flow.

14. The apparatus of claim 13, further comprising:

logic configured to receive the at least one request to establish the at least one group call;

logic configured to at least one announce message for the at least one group call on the first multicast flow; and logic configured to send media and signaling data for the at least one group call on the at least one second multicast flow.

15. The apparatus of claim 14, further comprising:

logic configured to establish one or more third multicast flows if a number of the one or more second multicast flows that is not assigned to any group call is less than a threshold.

16. The apparatus of claim 13, wherein the first multicast flow is established prior to the receipt of the at least one request and is persistent.

17. The apparatus of claim 13, wherein the information regarding the activity on the at least one second multicast flow includes scheduling information for the at least one second multicast flow.

18. The apparatus of claim 13, wherein at least one other of the one or more second multicast flows is not assigned to any group call.

19. The apparatus of claim 18, wherein the logic configured to establish establishes one or more additional second multicast flows if a number of the one or more second multicast flows that is not assigned to any group call is less than a threshold.

20. The apparatus of claim 13, further comprising:

logic configured to determine that the at least one group call has ended;

logic configured to release the at least one second multicast flow; and logic configured to release, if a number of the one or more second multicast flows is greater than a threshold after the release of the at least one second multicast flow, one or more multicast flows of the one or more second multicast flows that are not assigned to any group call.

21. The apparatus of claim 13, further comprising:

logic configured to establish, if a number of the one or more multicast flows that is not assigned to any group call is less than a minimum threshold and a total number of allocated multicast flows configured to transmit the signaling and media for the at least one group call is less than a maximum threshold, one or more additional multicast flows configured to transmit the signaling and media for the at least one group call.

22. An apparatus for group communications over multimedia broadcast-multicast services (MBMS) comprising:

logic configured to monitor a first multicast flow for at least one announce message regarding at least one group call, wherein the first multicast flow has a subframe schedule interval that is greater than a subframe schedule interval of one or more second multicast flows that are established prior to establishment of the at least one group call, and logic configured to switch, upon receipt of the at least one announce message, to at least one of the one or more second multicast flows that includes signaling and media for the at least one group call.

23. The apparatus of claim 22, wherein the first multicast flow carries scheduling information for the at least one second multicast flow.

24. The apparatus of claim 23, further comprising:

logic configured to enter an idle state during the subframe schedule interval of the first multicast flow.

25. An apparatus for group communications over multimedia broadcast-multicast services (MBMS) comprising:

means for establishing a first multicast flow;

means for establishing, prior to receipt of at least one request to establish at least one group call, one or more second multicast flows; and means for assigning at least one of the one or more second multicast flows to the at least one group call, wherein the at least one second multicast flow includes signaling and media for the at least one group call, and wherein the first multicast flow is configured to send information regarding activity on the at least one second multicast flow, and the first multicast flow has a subframe schedule interval that is greater than a subframe schedule interval of the at least one second multicast flow.

26. An apparatus for group communications over multimedia broadcast-multicast services (MBMS) comprising:

means for monitoring a first multicast flow for at least one announce message regarding at least one group call, wherein the first multicast flow has a subframe schedule interval that is greater than a subframe schedule interval of one or more second multicast flows that are established prior to establishment of the at least one group call, and means for switching, upon receipt of the at least one announce message, to at least one of the one or more second multicast flows that includes signaling and media for the at least one group call.

27. A non-transitory computer-readable medium for group communications over multimedia broadcast-multicast services (MBMS) comprising:

at least one instruction for establishing a first multicast flow;

at least one instruction for establishing, prior to receipt of at least one request to establish at least one group call, one or more second multicast flows; and at least one instruction for assigning at least one of the one or more second multicast flows to the at least one group call, wherein the at least one second multicast flow includes signaling and media for the at least one group call, and wherein the first multicast flow is configured to send information regarding activity on the at least one second multicast flow, and the first multicast flow has a subframe schedule interval that is greater than a subframe schedule interval of the at least one second multicast flow.

28. A non-transitory computer-readable medium for group communications over multimedia broadcast-multicast services (MBMS) comprising:

at least one instruction for monitoring a first multicast flow for at least one announce message regarding at least one group call, wherein the first multicast flow has a subframe schedule interval that is greater than a subframe schedule interval of one or more second multicast flows that are established prior to establishment of the at least one group call, and at least one instruction for, upon receipt of the at least one announce message, switching to at least one of the one or more second multicast flows that includes signaling and media for the at least one group call.

* * * * *